United States Patent
Kuroki et al.

(10) Patent No.: US 12,394,124 B2
(45) Date of Patent: Aug. 19, 2025

(54) TEXTURE GENERATION APPARATUS, TEXTURE GENERATION METHOD, OBJECT, AND PROGRAM

(71) Applicant: NIPPON TELEGRAPH AND TELEPHONE CORPORATION, Tokyo (JP)

(72) Inventors: Shinobu Kuroki, Tokyo (JP); Masataka Sawayama, Tokyo (JP); Shinya Nishida, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 235 days.

(21) Appl. No.: 17/776,635

(22) PCT Filed: Nov. 18, 2019

(86) PCT No.: PCT/JP2019/045084
§ 371 (c)(1),
(2) Date: May 13, 2022

(87) PCT Pub. No.: WO2021/100086
PCT Pub. Date: May 27, 2021

(65) Prior Publication Data
US 2022/0414957 A1    Dec. 29, 2022

(51) Int. Cl.
*G06T 11/40*  (2006.01)
*B29C 64/386*  (2017.01)
*G06V 10/50*  (2022.01)

(52) U.S. Cl.
CPC ............ *G06T 11/40* (2013.01); *B29C 64/386* (2017.08); *G06V 10/50* (2022.01)

(58) Field of Classification Search
CPC ..... G06T 11/40; G06T 11/001; B29C 64/386; G06V 10/50; G06V 10/74
See application file for complete search history.

(56) References Cited

FOREIGN PATENT DOCUMENTS

JP   2010245886 A   10/2010

OTHER PUBLICATIONS

Chelsea Tymms, Denis Zorin, and Esther P. Gardner, "Tactile perception of the roughness of 3D-printed textures", Journal of Neurophysiology 2018 119:3, 862-876 (Year: 2018).*

(Continued)

*Primary Examiner* — William A Beutel

(57) ABSTRACT

By performing, on an original image having pixel values representing depths of positions on a textured surface of a target object, a conversion for making an element histogram of a steerable pyramid of the original image the same as or similar to an element histogram of a steerable pyramid of a reference image having pixel values representing depths of positions on a textured surface of a reference object, for each spatial frequency band and each orientation band, histogram modulated images are obtained, and the histogram modulated images obtained for the spatial frequency bands and orientation bands are synthesized to obtain an image corresponding to a modulated image having pixel values representing depths of positions on a textured surface of a modulated object.

12 Claims, 6 Drawing Sheets
(1 of 6 Drawing Sheet(s) Filed in Color)

(56) References Cited

OTHER PUBLICATIONS

Yu et al. (2019) "Visual Texture-Based 3-D Roughness Measurement for Additive Manufacturing Surfaces", IEEE Access, May 29, 2019, vol. 7, pp. 186646-186656, Digital Object Identifier 10.1109/ACCESS.2019.2919682.

Sliman Bensmaia (2009) "Texture from touch" Scholarpedia 4(8): 7956.

Kuroki et al. (2018) "Haptic texture perception on 3D-printed surfaces transcribed from visual natural textures EuroHaptics," International Conference on Human Haptic Sensing and Touch Enabled Computer Applications, Jun. 5, 2018, Pisa, Italy.

Kuroki et al. (2019) "Haptic discrimination of 3D-printed patterns based on natural visual textures," Published Abstract: [uploaded on Mar. 7, 2019], Vision Sciences Society 2019 (VSS2019) [online] website: http://www.visionsciences.org.

Kuroki et al. (2019) "Haptic discrimination of 3D-printed patterns based on natural visual textures," Printed Publication: Vision Sciences Society 2019 (VSS2019), May 2019.

* cited by examiner

TEXTURE GENERATION APPARATUS, TEXTURE GENERATION METHOD, OBJECT, AND PROGRAM

CROSS-REFERENCE TO RELATED APPLICATIONS

This application is a U.S. National Stage Application filed under 35 U.S.C. § 371 claiming priority to International Patent Application No. PCT/JP2019/045084, filed on 18 Nov. 2019, the disclosure of which is hereby incorporated herein by reference in its entirety.

TECHNICAL FIELD

The present invention relates to a technique for generating a textured surface that is tactilely equivalent to a textured surface of a reference object by controlling a spatial depth distribution.

BACKGROUND ART

Controlling the feel of plastic product materials or the like that humans touch on a daily basis is important for the development of easy-to-use products. In recent years, with the development of 3D printer technology, it has become possible to process a complicated spatial pattern on a surface of a material. However, most of the human tactile research, which is the basis of tactile sensation control, is mainly concerned with simple roughness perception (NPL 1), and there are many unclear points about what kind of spatial pattern the human tactile system is sensitive to. In this regard, it has been reported that human tactile discrimination results are explained by the similarity of amplitude spectra when the spatial depth patterns are Fourier transformed, from tactile discrimination experiments using textures with various spatial depth distributions (NPL 2).

PRIOR ART LITERATURE

Non-Patent Literature

NPL 1: Bensmaia, S., "Texture from touch—Scholarpedia," (2009), 4(8), 7956.
NPL 2: Kuroki, S., Sawayama, M., & Nishida, S., "Haptic texture perception on 3D-printed surfaces transcribed from visual natural textures EuroHaptics," June, 2018, Pisa, Italy.

SUMMARY OF THE INVENTION

Problems to be Solved by the Invention

However, NPL 2 merely reveals factors defining the human tactile perceptions, and there is no known technique for generating a textured surface that is tactilely equivalent to a textured surface of a reference object based on this knowledge.

An object of the present invention is to generate a textured surface that is tactilely equivalent to a textured surface of a reference object.

Means to Solve the Problems

By performing, on an original image having pixel values representing depths of positions on a textured surface of a target object, a conversion for making an element histogram of a steerable pyramid of the original image the same as or similar to an element histogram of a steerable pyramid of a reference image having pixel values representing depths of positions on a textured surface of a reference object, for each spatial frequency band and each orientation band, histogram modulated images are obtained, and the histogram modulated images obtained for the spatial frequency bands and orientation bands are synthesized to obtain an image corresponding to a modulated image having pixel values representing depths of positions on a textured surface of a modulated object.

Effects of the Invention

This makes it possible to generate a textured surface that is tactilely equivalent to a textured surface of a reference object.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE EMBODIMENTS

Figure 1:
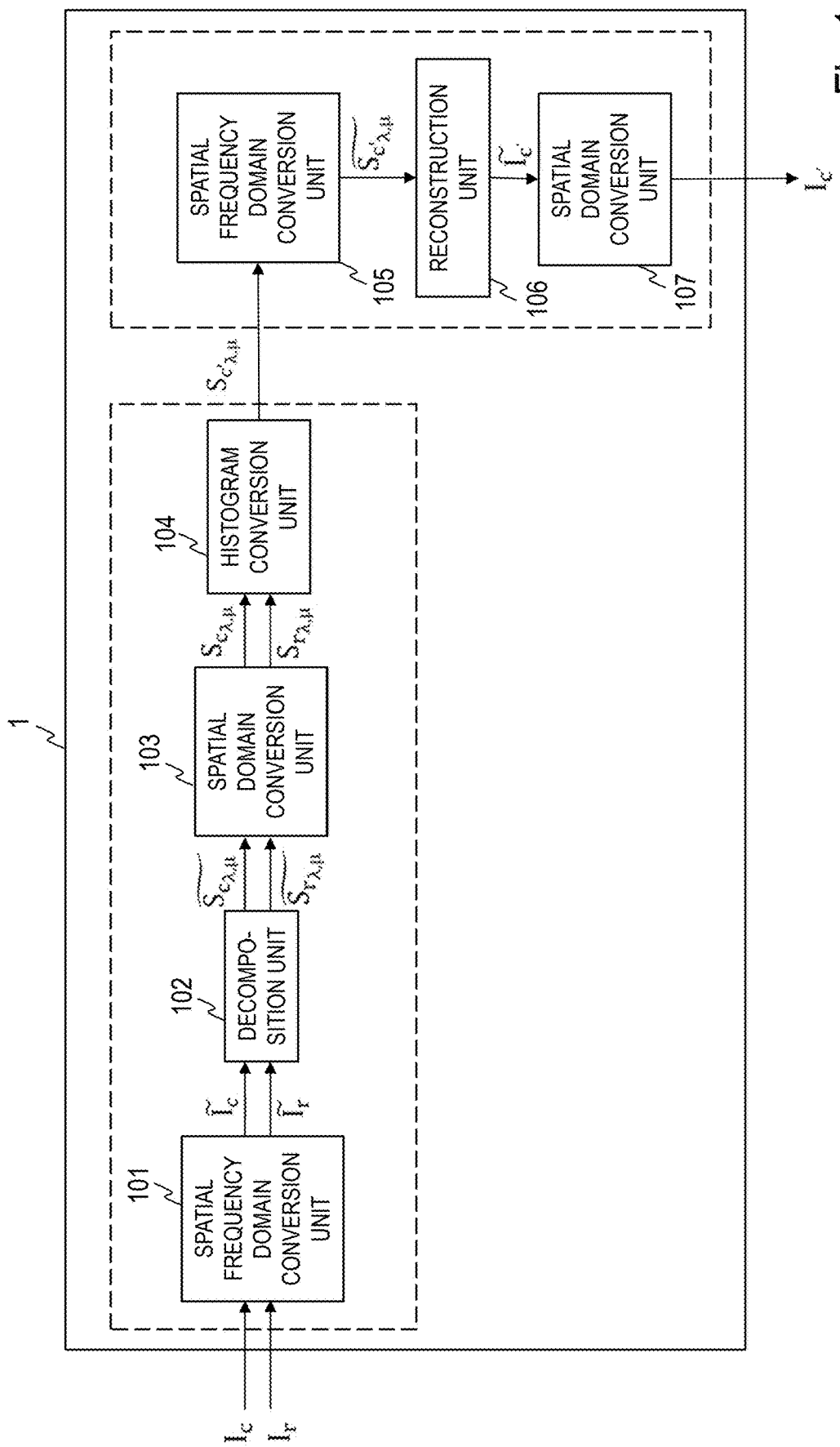
FIG. 1 is a block diagram illustrating a texture generation apparatus according to an embodiment.

Hereinafter, embodiments of the present invention will be described in detail with reference to the drawings.

In the following, in a case where the distribution of concavities and convexities on a textured surface (e.g., wood surface) (reference texture) of a desired reference object (e.g., wood), that is, the spatial depth distribution (height distribution) of the textured surface is known, a textured surface (new texture) of a new modulated object that gives a feel equivalent (tactilely equivalent) to the reference texture is generated. An object is, for example, an object having a certain surface area, such as a natural object such as wood or stone, or an attachment such as tile, wall, seal, package, or the like, and is an object that gives a feel with a three-dimensional spatial structure (two-dimensional distribution of convexities and concavities) that characterizes the object within a predetermined surface area.

In the present embodiment, a texture synthesis technique is utilized to generate a new texture that gives a feel equivalent to the spatial depth distribution of the reference texture. The texture synthesis technique is a technique for generating an image, but it can be used for generating the depths of a new texture by treating the spatial depth distribution of the textured surface as an image.

In the present embodiment, by matching with a reference image having each pixel value representing the depth of each position on the textured surface of the reference object, a modulated image can be obtained having each pixel value representing the depth of each position on the textured surface (new texture) of a modulated object that is difficult to distinguish from the reference object by tactile perception. Examples of the spatial frequency distribution to be matched include wavelet statistics and Fourier power spectrum. That is, for example, for a reference image, a modulated image having wavelet statistics or Fourier power spectrum cloth which is the same or substantially the same as the wavelet statistics or Fourier power spectrum of the reference image is found or generated. Matching, here, is to find or generate an image having a spatial frequency distribution which is the same or substantially the same as the spatial frequency distribution of a certain image. Note that, here, the term "substantially the same" refers to a case where, for example, spatial frequency distributions of two images are not exactly the same due to the resolutions of the two images or the like.

For example, with an original image having each pixel value representing the depth (height) of each position on the textured surface of any original object (target object), and a reference image having each pixel value representing the depth of each position on the textured surface of a reference object as input, histogram modulated images are obtained by performing a conversion on the original image that makes the element histogram of the steerable pyramid of the original image the same as or similar to the element histogram of the steerable pyramid of the reference image for each spatial frequency band and each orientation band. In addition, the histogram modulated images obtained in this way for each spatial frequency band and each orientation band are synthesized to obtain an image corresponding to a modulated image having each pixel value representing the depth of each position on the textured surface of a modulated object.

Functional Configuration of Texture Generation Apparatus

FIG. 1 illustrates a texture generation apparatus 1 according to an embodiment. The texture generation apparatus 1 is an apparatus that generates a new texture that is difficult to tactilely distinguish from a reference texture, i.e., a new texture having the same or substantially the same tactile perception as the reference texture. As illustrated in FIG. 1, the texture generation apparatus 1 according to the present embodiment includes a spatial frequency domain conversion unit 101 (first spatial frequency domain conversion unit), a decomposition unit 102, a spatial domain conversion unit 103 (first spatial domain conversion unit), a histogram conversion unit 104, a spatial frequency domain conversion unit 105 (second spatial frequency domain conversion unit), a reconstruction unit 106, and a spatial domain conversion unit 107 (second spatial domain conversion unit). The spatial frequency domain conversion unit 101, the decomposition unit 102, the spatial domain conversion unit 103, and the histogram conversion unit 104 correspond to a "conversion unit", and the spatial frequency domain conversion unit 105, the reconstruction unit 106, and the spatial domain conversion unit 107 correspond to a "synthesis unit".

Hardware and Cooperation Between Hardware and Software

Figure 2:
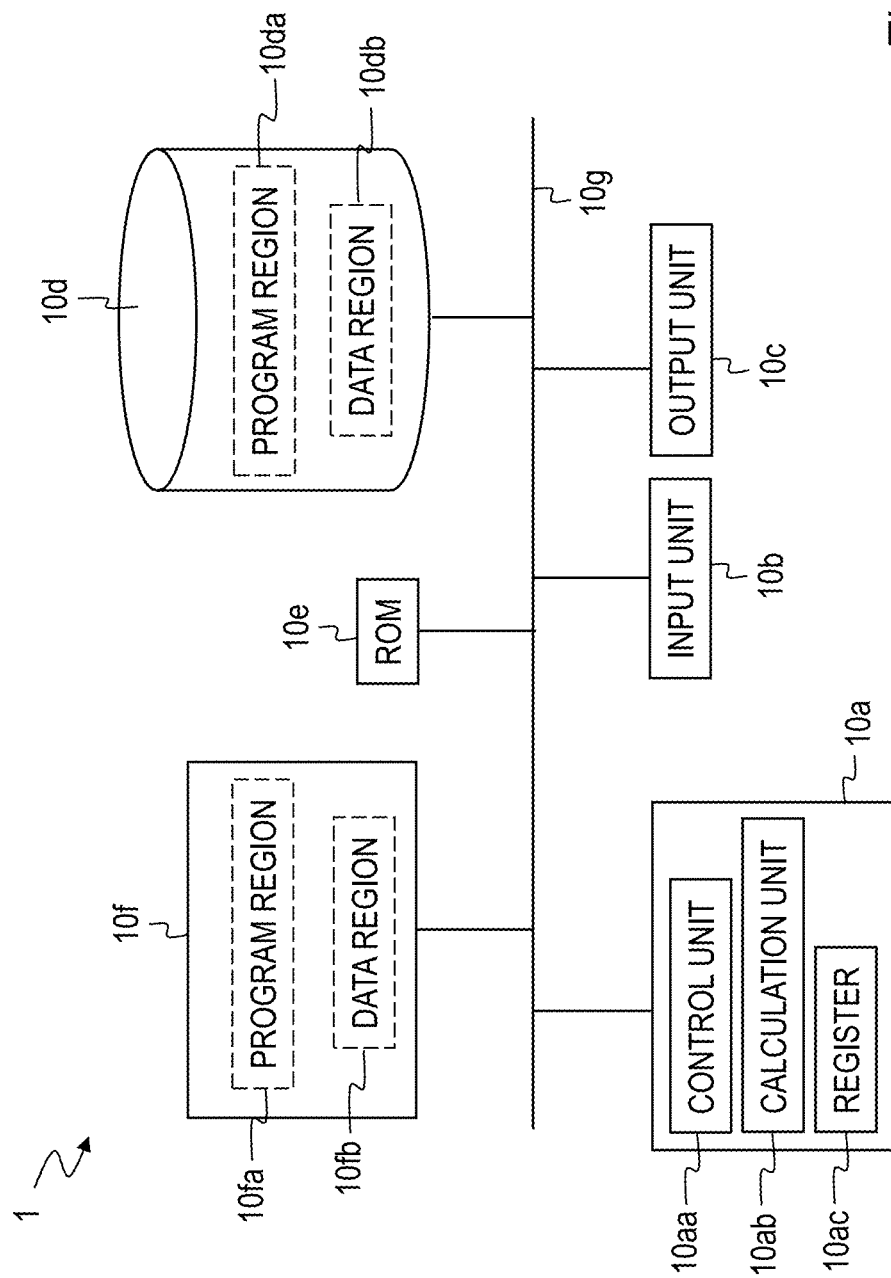
FIG. 2 is a block diagram illustrating a hardware configuration according to the embodiment.

FIG. 2 illustrates hardware constituting the texture generation apparatus 1 according to the present embodiment and cooperation between the hardware and software. Note that this configuration is an example and does not limit the present invention.

As illustrated in FIG. 2, the hardware constituting the texture generation apparatus 1 includes a central processing unit (CPU) 10a, an input unit 10b, an output unit 10c, an auxiliary storage device 10d, a random access memory (RAM) 10f, a read only memory (ROM) 10e, and a bus 10g. The CPU 10a of this example includes a control unit 10aa, a calculation unit 10ab, and a register 10ac, and executes various arithmetic processing in accordance with various programs loaded into the register 10ac. The input unit 10b is an input port, keyboard, mouse, or the like through which data is input, and the output unit 10c is an output port, display, or the like that outputs data. The auxiliary storage device 10d is, for example, a hard disk, a Magnet-Optical disk (MO), a semiconductor memory, or the like, and includes a program region 10da that stores a program for performing the processing of the present embodiment and a data region 10db in which various data are stored. The RAM 10f is a static random access memory (SRAM), a dynamic random access memory (DRAM), or the like, and includes a program region 10fa to which programs are written and a data region 10fb in which various types of data are stored. The bus 10g connects the CPU 10a, the input unit 10b, the output unit 10c, the auxiliary storage device 10d, the RAM 10f, and the ROM 10e in a communicable manner.

For example, the CPU 10a writes a program stored in the program region 10da of the auxiliary storage device 10d to the program region 10fa of the RAM 10f in accordance with the operating system (OS) program that has been read. Similarly, the CPU 10a writes data stored in the data region 10db of the auxiliary storage device 10d to the data region 10fb of the RAM 10f. Then, the address on the RAM 10f at which this program or data has been written is stored in the register 10ac of the CPU 10a. The control unit 10aa of the CPU 10a sequentially reads out these addresses stored in the register 10ac, reads out programs and data from the regions on the RAM 10f indicated by the read addresses, causes the calculation unit 10ab to sequentially execute the operations indicated by the programs, and stores the calculation results in the register 10ac. The texture generation apparatus 1 illustrated in FIG. 1 is embodied by the programs being read and executed on the CPU 10a in this manner Processing of Texture Generation Apparatus 1

An original image $I_c$ having each pixel value representing the depth of each position on the textured surface of a target object and a reference image $I_r$ having each pixel value representing the depth of each position on the textured surface of a reference object are input to the texture generation apparatus 1. The pixel values of the original image $I_c$ and the reference image $I_r$ represent, for example, the luminance values. In the present embodiment, the original image $I_c$ and the reference image $I_r$ are different from each other. That is, the textured surface of the target object and the textured surface of the reference object differ from each other in spatial arrangement. However, this is an example, and the original image $I_c$ and the reference image $I_r$ may be the same as each other.

Figure 3B:
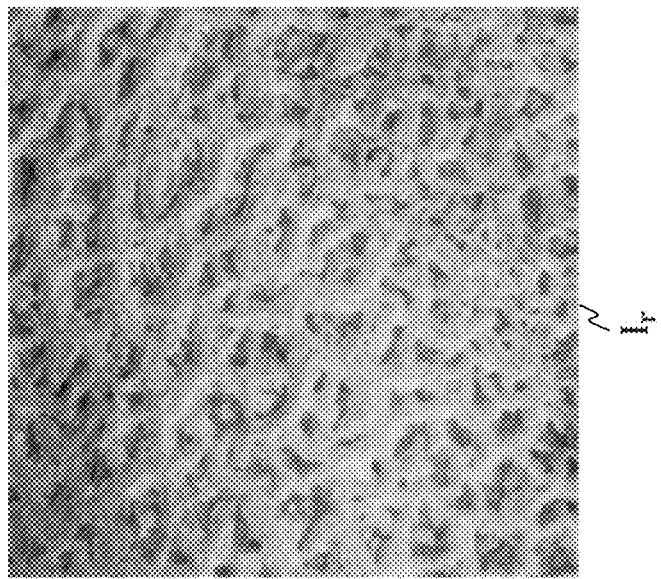
FIG. 3B is a diagram illustrating a reference image according to the embodiment.
Figure 3A:
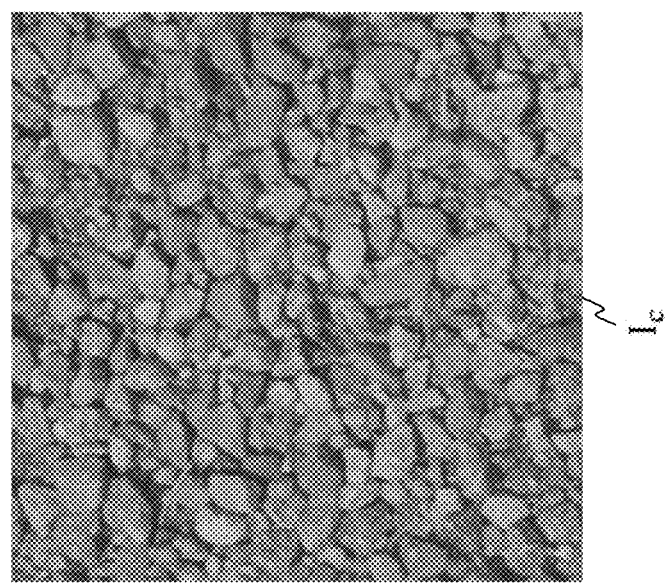
FIG. 3A is a diagram illustrating an original image according to the embodiment.

The original image $I_c$ is illustrated in FIG. 3A, and the reference image $I_r$ is illustrated in FIG. 3B. As illustrated in FIGS. 3A and 3B, the original image $I_c$ is a two-dimensional array (two-dimensional gray-scale image) having $I_c$ (x, y) as elements (pixels) and the reference image $I_r$ is a two-dimensional array (two-dimensional gray-scale image) having $I_r$ (x, y) as elements (pixels). The element values (pixel values) of $I_c$ (x, y) and $I_r$ (x, y) represent the depth of each position (x, y) on the textured surface. That is, the element values (pixel values) of $I_c$ (x, y) and $I_r$ (x, y) represent the magnitudes (z values) in a direction perpendicular to a predetermined surface with respect to a predetermined plane in the target object and the reference object when $I_c$ (x, y) and $I_r$ (x, y) are expressed in three dimensions (for example, obtained by cutting with a laser cutter or by 3D printing), i.e., the magnitudes of the concavities and convexities (depth or height of the concavities and convexities) on the textured surfaces of the target object and the reference object. (Hereinafter, a magnitude in a direction perpendicular to a predetermined surface represented by an element value (pixel value) is also referred to as the depth of each position of elements (pixels), the depth of each position (x, y) on the textured surface, or a value of depth (height).) Here, x represents the horizontal coordinates of the spatial domain, y represents the vertical coordinates of the spatial domain, and the conditions, $x_{min} \leq x \leq x_{max}$, $y_{min} \leq y \leq y_{max}$, $x_{min} \leq x_{max}$, and $y_{min} < y_{max}$, are satisfied. The size of the original image $I_c$ and the reference image $I_r$ depends on $x_{min}$, $x_{max}$, $y_{min}$, and $y_{max}$, and the resolving power of the original image $I_c$ depends on the resolution (the number of $I_c$ (x, y) per unit area) of the original image $I_c$ and the resolving power of the reference image $I_c$ depends on the resolution (the number of $I_r$ (x, y) per unit area) of the reference image $I_c$. The size and/or resolution of the original image $I_c$ and the reference image $I_c$ are set such that the textured surface printed by the 3D printer has a sufficient area and/or resolving power to give a rough feel. For example, the size and resolution of the original image $I_c$ and the reference image $I_r$ are set such that 3D printing can be performed by setting a resolving power that is sufficiently finer than a value that can produce different tactile perceptions, that is, 2 mm, which is the two-point discrimination threshold at the fingertip (the shortest distance between points that allows discrimination between when stimuli are applied to two points and a case where a stimulus is applied to one point), or the interval of the receptor (approximately 1 mm in a case of a shorter unit interval). For example, in a case where a 1 cm square material having a resolution of 0.1 mm is printed, a 1 cm square image of 100×100 pix may be used as the original image $I_c$ and the reference image $I_r$, but in a case where a 10 cm square material having the same resolution is printed, a 1 cm square image of 1000×1000 pix is necessary as the original image $I_c$ and the reference image $I_r$.

Spatial Frequency Domain Conversion Unit 101

The original image $I_c$ and the reference image $I_r$ are input to the spatial frequency domain conversion unit 101. The spatial frequency domain conversion unit 101 converts the original image $I_c$ into an original image $\tilde{I}_c$ of the spatial frequency domain (spatial frequency domain original image) to output the spatial frequency domain original image $I_c^\sim$, and converts the reference image $I_r$ into a reference image $\tilde{I}_r$ of the spatial frequency domain (spatial frequency domain reference image) to output the spatial frequency domain reference $I_r^\sim$. Where, the upper right superscript "~" of "$I_c^\sim$" or "$I_r^\sim$" should be written directly above "$I_c$" or "$I_r$", but hereinafter may be written in the upper right of "$I_c$" or "$I_r$", due to the limitation on the description notation. The spatial frequency domain original $I_c^\sim$ and the spatial frequency domain reference image $I_r^\sim$ are two-dimensional arrays having $I_c^\sim$ ($\omega_x$, $\omega_y$) and $I_r^\sim$ ($\omega_x$, $\omega_y$) as elements, respectively. Here, $\omega_x$ represents the spatial frequency in the horizontal direction, and $\omega_y$ represents the spatial frequency in the vertical direction. For example, discrete Fourier transform or wavelet transform can be used for the conversion from the original $I_c$ to the spatial frequency domain original $I_c^\sim$ and the conversion from the reference image $I_r$ to the spatial frequency domain reference image $I_r^\sim$.

Decomposition Unit 102

The spatial frequency domain original $I_c^\sim$ and the spatial frequency domain reference image $I_r^\sim$ are input to the decomposition unit 102. The decomposition unit 102 applies a complex steerable filter sequence $\Psi$ to the spatial frequency domain original $I_c^\sim$ and the spatial frequency domain reference image to obtain and output a complex steerable pyramid $\widetilde{S_{c\lambda,\mu}}$ of the spatial frequency domain original $I_c^\sim$ and a complex steerable pyramid $\widetilde{S_{r\lambda,\mu}}$ of the spatial frequency domain reference image $I_r^\sim$. Here, the steerable filter sequence $\Psi$ includes steerable filters $\Psi_{\lambda,\mu}$ corresponding to the spatial frequency band $\lambda$ and the orientation band $\mu$. Here, $\lambda$ is an integer index corresponding to a spatial frequency band having a predetermined width, and $\mu$ is an integer index corresponding to an orientation band having a predetermined width. The conditions, $\lambda_{min} \leq \lambda \leq \lambda_{max}$, $\mu_{min} \leq \mu \leq \mu_{max}$, $\lambda_{min} > \lambda_{max}$, $\mu_{min} > \mu_{max}$, are satisfied. A smaller $\lambda$ corresponds to a lower frequency band. For example, by giving values of $\lambda=4$ and $\mu=4$, a complex steerable pyramid can be obtained for an image having a spatial pixel size of 256 pixels×256 pixels. As described below, the decomposition unit 102 multiplies each of the spatial frequency domain original $I_c^\sim$ and the spatial frequency domain reference image $I_r^\sim$ by the steerable filter $\Psi_{\lambda,\mu}$ for all combinations of $\lambda$ and $\mu$ to obtain and output a complex steerable pyramid $\widetilde{S_{c\lambda,\mu}}$ of spatial frequency domain original $I_c^\sim$ and a complex steerable pyramid $\widetilde{S_{r\lambda,\mu}}$ of the spatial frequency domain reference image corresponding to each spatial frequency band $\lambda$ and each orientation band $\mu$.

$$\widetilde{S_{c\lambda,\mu}} = \tilde{I}_c \Psi_{\lambda,\mu}$$

$$\widetilde{S_{r\lambda,\mu}} = \tilde{I}_r \Psi_{\lambda,\mu}$$

In the following, due to the limitation of the description notation, the complex steerable pyramid of the spatial frequency domain original $I_c^\sim$ may be denoted as $S^\sim c_{\lambda,\mu}$, and the complex steerable pyramid of the spatial frequency domain reference $I_r^\sim$ may be denoted as $S^\sim r_{\lambda,\mu}$.

Spatial Domain Conversion Unit 103

The complex steerable pyramid $S^\sim c_{\lambda,\mu}$ of the spatial frequency domain original image $I_c^\sim$ and the complex steerable pyramid $S^\sim r_{\lambda,\mu}$ of the spatial frequency domain reference $I_r^\sim$ are input to the spatial domain conversion unit 103. The spatial domain conversion unit 103 converts the complex steerable pyramid $S^\sim c_{\lambda,\mu}$ of the spatial frequency domain original $I_c^\sim$ into a complex steerable pyramid $S'c_{\lambda,\mu}$ of the spatial domain, and outputs the real part of the complex steerable pyramid $S'c_{\lambda,\mu}$ of the spatial domain as a steerable pyramid $Sc_{\lambda,\mu}$ of the original image. The spatial domain conversion unit 103 converts the complex steerable pyramid $S^\sim r_{\lambda,\mu}$ of the spatial frequency domain reference $I_r^\sim$ into a complex steerable pyramid $S'r_{\lambda,\mu}$ of the spatial domain, and outputs the real part of the complex steerable pyramid $S'r_{\lambda,\mu}$ of the spatial domain as a steerable pyramid $Sr_{\lambda,\mu}$ of the reference image. For example, inverse discrete Fourier transform or inverse wavelet transform can be used for the conversion from the complex steerable pyramids $S^\sim c_{\lambda,\mu}$ and $S^\sim c_{\lambda,\mu}$ to the complex steerable pyramids $S'c_{\lambda,\mu}$ and $S'r_{\lambda,\mu}$. The steerable pyramid $Sc_{\lambda,\mu}$ and the steerable pyramid $Sr_{\lambda,\mu}$ are two-dimensional arrays having $Sc_{\lambda,\mu}$ (x, y) and $Sr_{\lambda,\mu}$ (x, y) as elements (pixels), respectively.

Histogram Conversion Unit 104

The steerable pyramid $Sc_{\lambda,\mu}$ of the steerable pyramid $Sr_{\lambda,\mu}$ of the reference image are input to the histogram conversion unit 104. The histogram conversion unit 104 obtains a histogram modulated image $Sc'_{\lambda,\mu}$ by performing a conversion on the original image that makes the element histogram of the steerable pyramid $Sc_{\lambda,\mu}$ of the original image the same as or similar to the element histogram of the steerable pyramid $Sr_{\lambda,\mu}$ of the reference image for each spatial frequency band λ and each orientation band μ, and outputs the histogram modulated image $Sc'_{\lambda,\mu}$. That is, in each spatial frequency band λ and each orientation band μ, the element histogram of the histogram modulated image $Sc'_{\lambda,\mu}$ is the same as or similar to the element histogram of the steerable pyramid $Sr_{\lambda,\mu}$ of the reference image. Note that the element histogram of the steerable pyramid $Sc_{\lambda,\mu}$ is a histogram of the elements $Sc_{\lambda,\mu}$ (x, y) of the steerable pyramid $Sc_{\lambda,\mu}$. Similarly, the element histogram of the steerable pyramid $Sr_{\lambda,\mu}$ is a histogram of the elements $Sr_{\lambda,\mu}$ (x, y) of the steerable pyramid $Sr_{\lambda,\mu}$. That the element histogram of $Sc'_{\lambda,\mu}$ is similar to the element histogram of $Sr_{\lambda,\mu}$ means that the similarity between the element histogram of $Sc'_{\lambda,\mu}$ and the element histogram of $Sr_{\lambda,\mu}$ is equal to or less than a predetermined threshold value, or means that the distance between the element histogram of $Sc'_{\lambda,\mu}$ and the element histogram of $Sr_{\lambda,\mu}$ is equal to or greater than a predetermined threshold value. There is no limitation on the conversion method for making the element histogram of the steerable pyramid $Sc_{\lambda,\mu}$ of the original image the same as or similar to the element histogram of the steerable pyramid $Sr_{\lambda,\mu}$ of the reference image. Any conversion method of images may be used as long as one of the histograms of the two images is converted to be the same as or similar to the other. As an example, a conversion method using a cumulative distribution function $Fc_{\lambda,\mu}$ (i) and an inverted cumulative distribution function $F'r_{\lambda,\mu}$ ($Fc_{\lambda,\mu}$ (i)) can be used, for example. The cumulative distribution function $Fc_{\lambda,\mu}$ is defined with the element values i=$Sc_{\lambda,\mu}$ (x, y) as random variables for each steerable pyramid $Sc_{\lambda,\mu}$ of each spatial frequency band λ and each orientation band μ. The cumulative distribution function $Fc_{\lambda,\mu}$ (i) is a function that outputs the cumulative probability density (scalar) of the element values less than or equal to the element value i of the steerable pyramid $Sc_{\lambda,\mu}$, for the input of the element value i of the steerable pyramid $Sc_{\lambda,\mu}$. For example, the cumulative distribution function $Fc_{\lambda,\mu}$ (i) outputs any value from 0 to 1. The inverted cumulative distribution function $F'r_{\lambda,\mu}$ is defined for each steerable pyramid $Sr_{\lambda,\mu}$ of each spatial frequency band λ and each orientation band μ. The inverted cumulative distribution function $F'r_{\lambda,\mu}$ ($Fc_{\lambda,\mu}$ (i)) outputs the element value i' (converted element value i') of the image in which the cumulative probability density less than or equal to the element value i is $Fc_{\lambda,\mu}$ (i) for the input of the cumulative probability density $Fc_{\lambda,\mu}$ (i). The cumulative distribution function $Fc_{\lambda,\mu}$ (i) and the inverted cumulative distribution function $F'r_{\lambda,\mu}$ ($Fc_{\lambda,\mu}$ (i)) convert the element value i of the input steerable pyramid $Sc_{\lambda,\mu}$ into the converted element value i' for each spatial frequency band λ and each orientation band μ, and outputs the histogram modulated image $Sc'_{\lambda,\mu}$, which is an image having the converted element values i' as elements.

Spatial Frequency Domain Conversion Unit 105

The histogram modulated image $Sc'_{\lambda,\mu}$ is input to the spatial frequency domain conversion unit 105. The spatial frequency domain conversion unit 105 converts the histogram modulated image $Sc'_{\lambda,\mu}$ into a histogram modulated image $\widetilde{Sc'_{\lambda,\mu}}$ of the spatial frequency domain (spatial frequency domain histogram modulated image) and outputs the spatial frequency domain histogram modulated image $S\widetilde{c'}_{\lambda,\mu}$. It should be noted that the superscript "~" of "$Sc'_{\lambda,\mu}$" should be written directly above the entire "$Sc'_{\lambda,\mu}$", but due to the limitation of the description notation, it is written in the upper right of "S". For example, discrete Fourier transform or wavelet transform can be used for the conversion from the histogram modulated image $Sc'_{\lambda,\mu}$ to the spatial frequency domain histogram modulated image $S\widetilde{c'}_{\lambda,\mu}$.

Reconstruction Unit 106

The spatial frequency domain histogram modulated image $S\widetilde{c'}_{\lambda,\mu}$ is input to the reconstruction unit 106. The reconstruction unit 106 synthesizes the spatial frequency domain histogram modulated image $S\widetilde{c'}_{\lambda,\mu}$ of all the spatial frequency bands λ and the orientation bands μ to obtain a spatial frequency domain modulated image $\widetilde{I_{c'}}$ and outputs the spatial frequency domain modulated image $\widetilde{I_{c'}}$. The reconstruction unit 106 obtains, for example, the spatial frequency domain modulated image $\widetilde{I_{c'}}$ as follows.

$$\widetilde{I_{c'}} = \sum_{\lambda,\mu} \widetilde{Sc'_{\lambda,\mu}}$$

Alternatively, the reconstruction unit 106 may apply the steerable filter sequence Ψ described above to the spatial frequency domain histogram modulated image $S\widetilde{c'}_{\lambda,\mu}$ to obtain the spatial frequency domain modulated image $\widetilde{I_{c'}}$ as follows.

$$\widetilde{I_{c'}} = \sum_{\lambda,\mu} \Psi_{\lambda,\mu} \widetilde{Sc'_{\lambda,\mu}}$$

Spatial Domain Conversion Unit 107

The spatial frequency domain modulated image $\widetilde{I_{c'}}$ is input to the spatial domain conversion unit 107. The spatial domain conversion unit 107 converts the spatial frequency domain modulated image $\widetilde{I_{c'}}$ into a modulated image $I_{c'}$ of the spatial domain and outputs the modulated image $I_{c'}$. Here, the modulated image $I_{c'}$ is a two-dimensional array having $I_{c'}$ (x, y) as elements (pixels). For example, inverse discrete Fourier transform or inverse wavelet transform can be used for the conversion from the spatial frequency domain modulated image $\widetilde{I_{c'}}$ to the modulated image $I_{c'}$.

Modulated Object

The element values (pixel values) of the modulated image $I_{c'}$ obtained as described above are used as the depth values (height values) when the modulated image $I_{c'}$ is three-dimensionally represented, for example, for 3D printing. That is, in a case where a three-dimensional representation of the modulated image $I_{c'}$ is realized by 3D printing, the information representing the modulated image $I_{c'}$ is input to the 3D printer, and the 3D printer prints the pixel values of the modulated image $I_{c'}$ as the depth of each position on the textured surface in 3D to obtain an object (modulated object) with the textured surface having the depth of each position represented by each pixel value of the modulated image L. Each position on the textured surface of the modulated object has the depth represented by the value of each position of the modulated image $I_c$ obtained by matching the original image $I_c$ to the reference image $I_r$. Matching, here, is to find or generate an image having a spatial frequency distribution which is the same as or substantially the same as the spatial frequency distribution of a certain image. That is, the textured surface of the modulated object is difficult to distinguish from the textured surface of the reference object by tactile perception. In a case where the original image $I_c$ and the reference image $I_r$ are mutually different images, the spatial arrangement of the concave-convex pattern on the textured surface of the modulated object is different from the spatial arrangement of the value of the depth at each point on the textured surface of the reference object. Here, the spatial arrangement of the concave-convex pattern means the spatial arrangement of the value of the depth (value of height) at each point on the textured surface of the modulated object, that is, what z value (depth (height)) is taken by the point (pixel) with a certain xy coordinate value in the image. That is, the modulated object has the depth at each position with a spatial frequency distribution matching the spatial frequency distribution of the value representing the depth of each position on the textured surface of the reference object, and has a textured surface different from the spatial arrangement of the value of the depth at each point on the textured surface of the reference object. For example, a modulated object is generated having a textured surface (generated from the original image and the reference image) being the same in the value and frequency of the depth (height) (the histogram of the pixel values in an image where the depth is treated as the luminance value (pixel value)) as well as the spatial periodicity of the depth (height) (Amplitude spectrum in an image where the depth is treated as the luminance value (pixel value)) and different in the spatial arrangement of the depth (height), as compared to the textured surface of the reference object. The textured surface (new textured surface) of such a modulated object is tactilely perceived equivalently (as a touch), even if perceived visually differently from the textured surface of the reference object (reference textured surface).

Experiment

Figure 4:
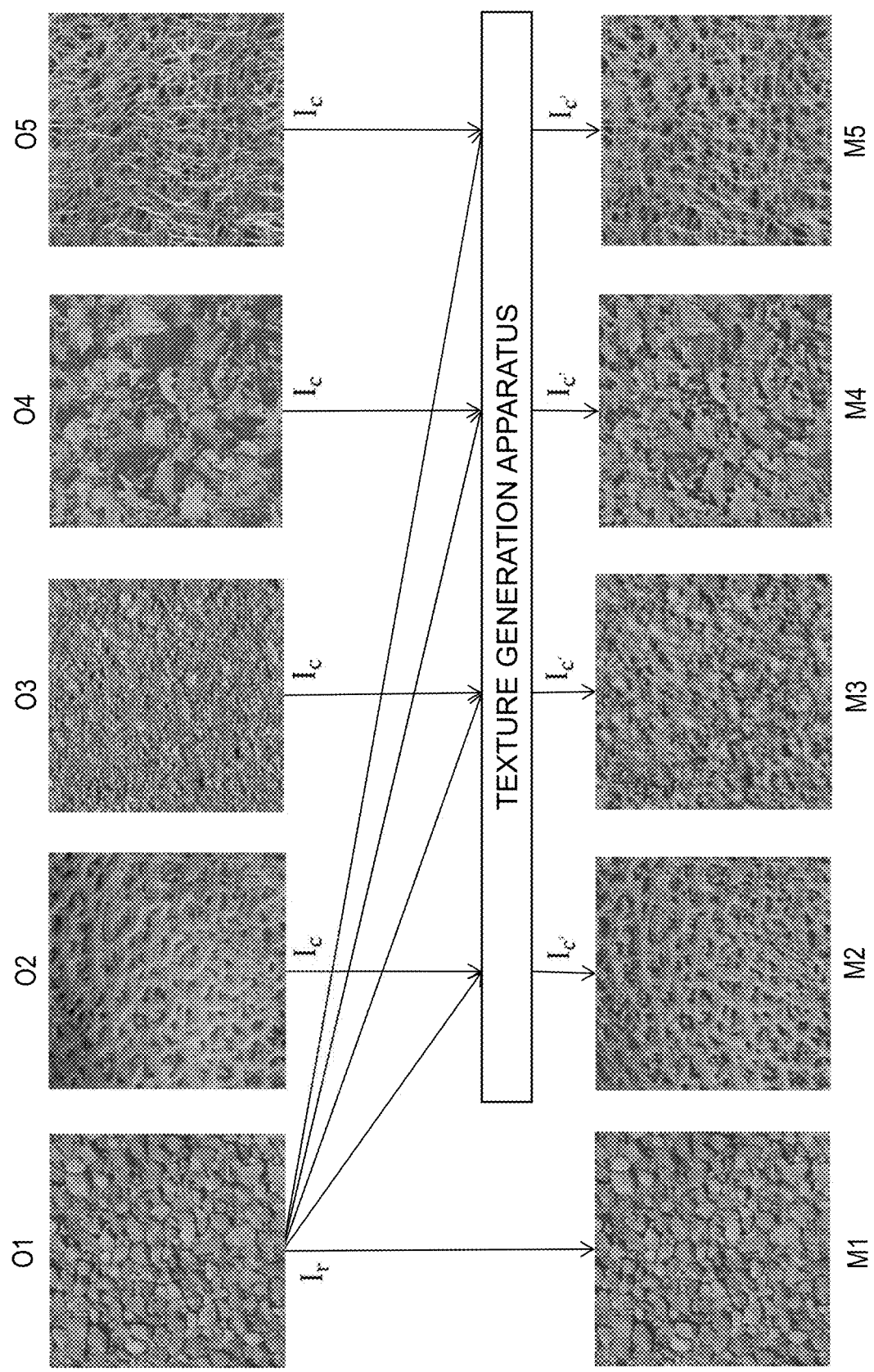
FIG. 4 is a diagram for exemplifying experimental contents.
Figure 5:
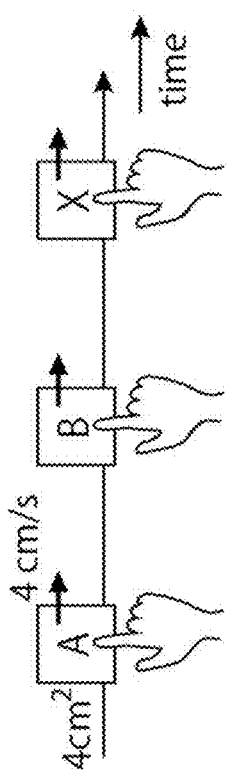
FIG. 5 is a diagram for exemplifying experimental results.
Figure 5:
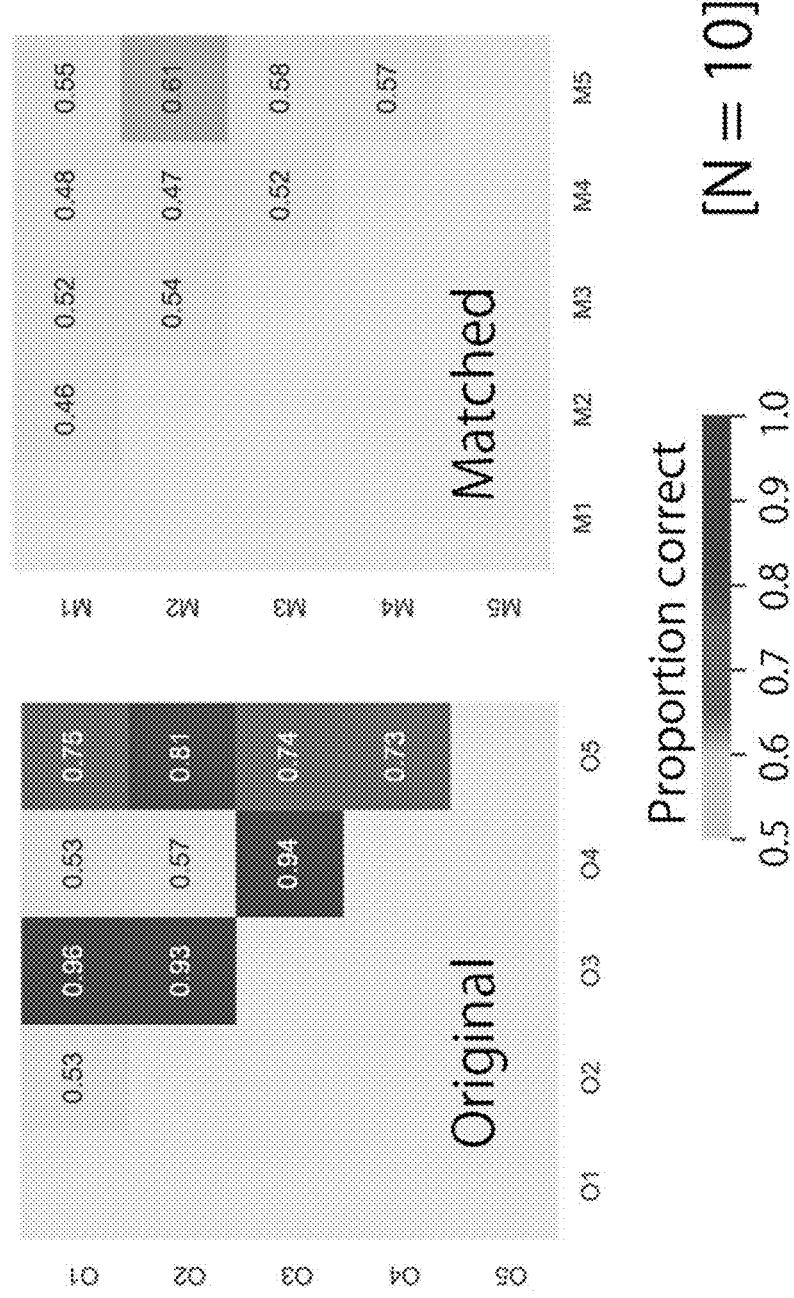

As shown in FIG. 4, five natural images O1 to O5 were prepared. In the experiment, 4 cm square images of 256×256 pix were used as the natural images O1 to O5. One of them (O1) was used as a reference image $I_r$, the remaining four images (O2 to O5) were used as original images $I_c$, and these reference $I_r$ and the original images $I_c$ were input to the texture generation apparatus 1. The processing described above of the texture generation apparatus 1 was performed to obtain four modulated images $I_{c'}$ (M2 to M5). Note that M1 is the same image as O1. Objects for tactile stimulation (material with length×width×thickness: 40 mm×40 mm×10 to 12 mm) were created by using the element values of each of these 10 images (O1 to O5, M1 to M5), as the depths of the concavities and convexities in 3D printing (FIG. 5). In this way, the objects corresponding to O1 to O5 and M1 to M5 were used to experimentally examine whether the materials could be distinguished by the tactile perception. As illustrated in FIG. 5, in the experiment, 10 observers passively touched the objects with the index finger of the right hand. During the experiment, the objects or fingers were shielded from the observers so that the observers would not see the objects or fingers. After the objects were presented three times as A, B, X (X is either A or B), the observers replied with two compulsory choices as to whether the object X was the object A or B. Two objects out of the five objects generated from the five natural images (O1 to O5) are treated as objects A and B, and the result of examining whether they can be distinguished is shown in the graph of Original in FIG. 5. When the values on the vertical axis and the horizontal axis are A and B, the probability of correctly answering whether X is A or B is displayed in each square. A square with a large value and a dark color indicates that the objects A and B can be distinguished, and a square with a value close to 0.5 and a light color indicates that the objects cannot be distinguished. From the experimental results, it can be seen that the objects created based on O3 and O5 are distinguished from other materials. Next, the results of examining whether the two objects selected from the objects generated from the five modulated images (M1 to M5) can be distinguished from each other are shown in the graph of Matched in FIG. 5. Compared with the results of the natural images (graph of Original), it can be seen that there are many squares with a value close to 0.5 and a light color, and they were perceptually indistinguishable by the tactile perception.

Supplement

As described above, in the embodiment, the spatial frequency domain conversion unit 101 converts the input original $I_c$ and the reference image $I_r$ into the spatial frequency domain to obtain and output the spatial frequency domain original image $I_c^\sim$ and the spatial frequency domain reference image $I_r^\sim$. The decomposition unit 102 uses the input spatial frequency domain original $I_c^\sim$ and the spatial frequency domain reference $I_c^\sim$ to obtain and output the complex steerable pyramid $S^\sim c_{\lambda,\mu}$ of the spatial frequency domain original image and the complex steerable pyramid $S^\sim r_{\lambda,\mu}$ of the spatial frequency domain reference image for each spatial frequency band $\lambda$ and each orientation band $\mu$. The spatial domain conversion unit 103 converts the input complex steerable pyramid $S^\sim c_{\lambda,\mu}$ of the spatial frequency domain original image and the input complex steerable pyramid $S^\sim r_{\lambda,\mu}$ of the spatial frequency domain reference image into the spatial domain to obtain the complex steerable pyramid $S'c_{\lambda,\mu}$ of the spatial domain of the original image and the complex steerable pyramid $S'r_{\lambda,\mu}$ of the spatial domain of the reference image for each spatial frequency band $\lambda$ and each orientation band $\mu$, obtain the real part of the complex steerable pyramid $S'c_{\lambda,\mu}$ of the spatial domain of the original image as the steerable pyramid $Sc_{\lambda,\mu}$ of the original image, and obtain the real part of the complex steerable pyramid $S'c_{\lambda,\mu}$ of the spatial domain of the reference image as the steerable pyramid $Sr_{\lambda,\mu}$ of the reference image, and outputs the steerable pyramid $Sc_{\lambda,\mu}$ of the original image $I_c$ and the steerable pyramid $Sr_{\lambda,\mu}$ of the reference image. The histogram conversion unit 104 uses the input steerable pyramid $Sr_{\lambda,\mu}$ of the reference image and the input steerable pyramid $Sc_{\lambda,\mu}$ of the original image to obtain and output the histogram modulated image $Sc'_{\lambda,\mu}$. The histogram modulated image $Sc'_{\lambda,\mu}$ is obtained by performing a conversion on the original $I_c$ that makes the element histogram of the steerable pyramid $Sc_{\lambda,\mu}$ of the original image the same as or similar to the element histogram of the steerable pyramid $Sr_{\lambda,\mu}$ of the reference image for each spatial frequency band $\lambda$ and each orientation band $\mu$. The spatial frequency domain conversion unit 105 converts the input histogram modulated image $Sc'_{\lambda,\mu}$ into the spatial frequency domain to obtain and output the spatial frequency domain histogram modulated image $S^\sim c'_{\lambda,\mu}$ for each spatial frequency band $\lambda$ and each orientation band $\mu$. The reconstruction unit 106 synthesizes the input spatial frequency domain histogram modulated image $Sc'_{\lambda,\mu}$ to obtain and output the spatial frequency domain modulated image $I_{c'}^\sim$. The spatial domain conversion unit 107 converts the input spatial frequency domain modulated image $I_{c'}^\sim$ into the spatial domain to obtain and output the modulated image $I_{c'}$ of the spatial domain.

The textured surface of the modulated object whose depth at each position is represented by each pixel value of the modulated image $I_{c'}$ is tactilely equivalent to the textured surface of the reference object. In the analysis based on the Fourier transform of NPL 2, in a case where the spatial sizes of the textured surface of the reference object and the textured surface of the target object are different, the amplitude spectrum cannot be uniquely matched, and a textured surface that is tactilely equivalent to the textured surface of the reference object cannot be generated. On the other hand, in the present embodiment, even if the space sizes of the textured surface of the reference object and the textured surface of the target object are different, a textured surface that is tactilely equivalent to the textured surface of the reference object can be generated.

In the prior arts, basic skin performance has been investigated using homogeneous stimuli (for example, using repeating with only frequencies in a narrow band), and literature says, "it is possible to distinguish the difference even in nanometers." Regarding the distribution of receptors, there are anatomical values such as "140 units/cm$^2$" (1 mm interval or more). The inventors have found that the skin with such fine performance can be tricked with illusion that "different signals can be encoded at the receptor and nerve levels, but for some reason they feel the same when decoded." The present invention is based on this discovery. It should be noted that the finer texture feeling can be presented as the resolution of the textured surface of the object output from the 3D printer increases. For example, it is preferable to carry out with a printer capable of producing a resolution finer than 0.25 mm.

Figure 6:
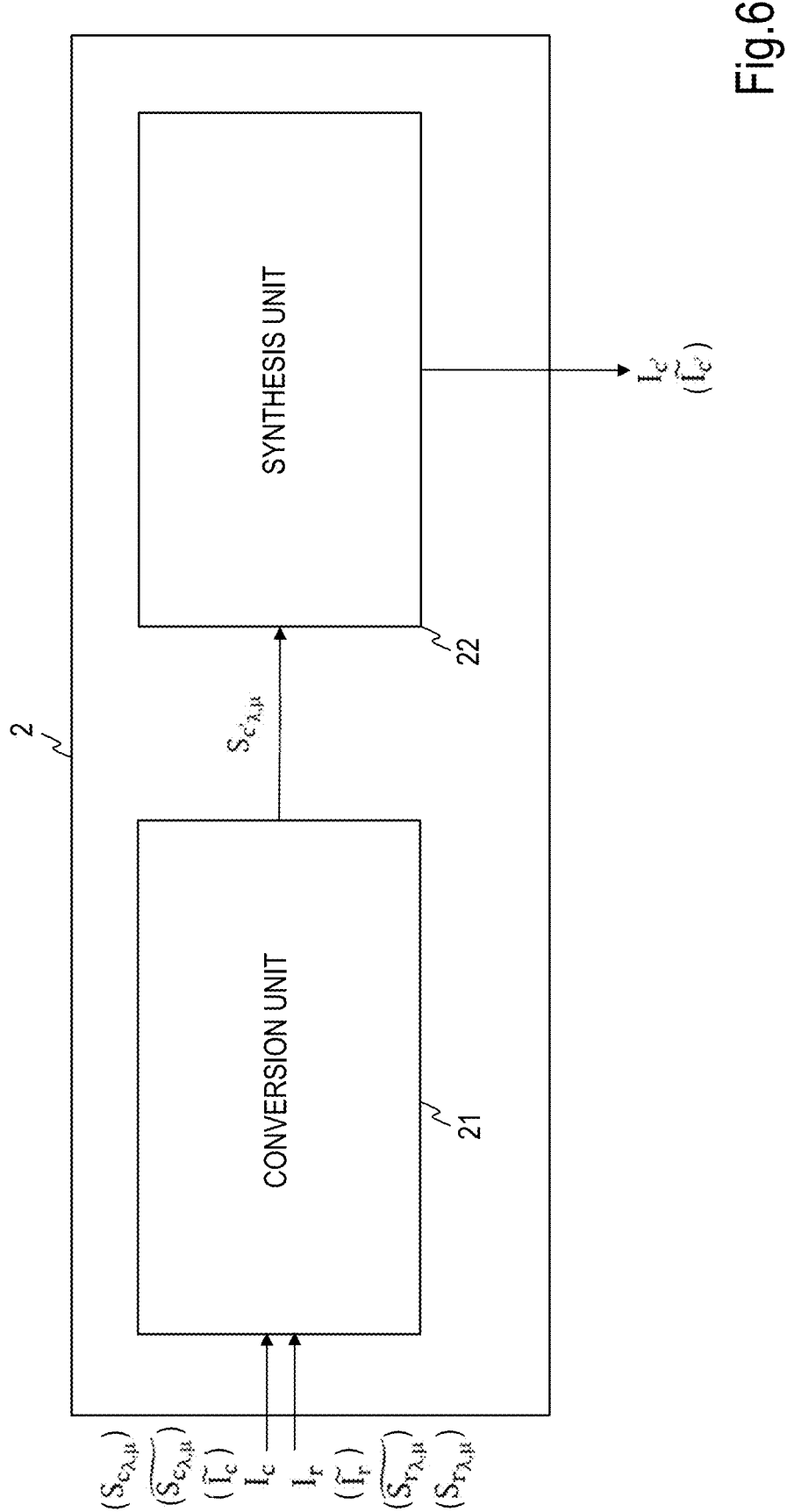
FIG. 6 is a block diagram illustrating a texture generation apparatus according to the embodiment.

The algorithm described above is merely an example, and the spatial frequency distribution of the pixel values of the original image may be matched with that of the reference image in other ways. For example, as illustrated in FIG. 6, the texture generation apparatus 2 may include a conversion unit 21 and a synthesis unit 22 as follows. The conversion unit 21 obtains and outputs a histogram modulated image $Sc'_{\lambda,\mu}$ by performing a conversion on the original image that makes the element histogram of the steerable pyramid $Sc_{\lambda,\mu}$ of the original image the same as or similar to the element histogram of the steerable pyramid $Sr_{\lambda,\mu}$ of the reference image for each spatial frequency band λ and each orientation band μ. The histogram modulated image $Sc'_{\lambda,\mu}$ is input to the synthesis unit 22. The synthesis unit 22 synthesizes the histogram modulated image $Sc'_{\lambda,\mu}$ obtained for each spatial frequency band λ and each orientation band μ to obtain and output an image corresponding to the modulated image $I_{c'}$ having each pixel value representing the depth of each position on the textured surface of the modulated object. For example, the spatial frequency distribution of the pixel values representing the depth of each position on the textured surface of the modulated object matches the spatial frequency distribution of the pixel values representing the depth of each position on the textured surface of the reference object, and the modulated object and the reference object are difficult to distinguish from each other by the tactile perception.

Here, the conversion unit 21 may receive an input of the original $I_c$ and the reference image $I_r$ as described above, may receive an input of the spatial frequency domain original $I_c\tilde{}$ and the spatial frequency domain reference image $I_r\tilde{}$, may receive an input of the complex steerable pyramid $S\tilde{}c_{\lambda,\mu}$ of the spatial frequency domain original image $I_c$ and the complex steerable pyramid $S\tilde{}r_{\lambda,\mu}$ of the spatial frequency domain reference image, or may receive an input of the steerable pyramid $Sc_{\lambda,\mu}$ of the original image $I_c$ and the steerable pyramid $Sr_{\lambda,\mu}$ of the reference image. The synthesis unit 22 may output the modulated image $I_{c'}$, or may output the spatial frequency domain modulated image $I_{c'}\tilde{}$, as an image corresponding to the modulated image $I_{c'}$.

That is, by matching with a reference image having each pixel value representing the depth of each position on the textured surface of a reference object (for example, the spatial frequency distribution is wavelet statistics, or Fourier power spectrum), an image can be obtained corresponding to a modulated image having each pixel value representing the depth of each position on the textured surface of a modulated object that is difficult to distinguish from the reference object by tactile perception. Any method may be used as long as the image is obtained by such a method described above. For example, by performing a conversion on the original image that makes wavelet statistics of the spatial frequency distribution of the original image having each pixel value representing the depth of each position on the textured surface of the target object the same as or substantially the same as wavelet statistics of the reference image having each pixel value representing the depth of each position on the textured surface of the reference object, an image may be obtained corresponding to a modulated image having each pixel value representing the depth of each position on the textured surface of a modulated object that is difficult to distinguish from the reference object by tactile perception.

Other Modifications and Others

Note that the present invention is not limited to the above-described embodiment. For example, as described above, the texture generation apparatus is an apparatus embodied by a general purpose or dedicated computer including a processor (hardware processor) such as a CPU or a memory such as an RAM/ROM, or the like, executing a predetermined program. The computer may include a single processor or memory, or may include a plurality of processors or memories. This program may be installed on the computer, or may be recorded in the ROM or the like in advance. Some or all of the processing units may be implemented by using an electronic circuit that independently realize a processing function, instead of using an electronic circuit (circuitry) that realize a functional configuration with a program loaded into the electronic circuit, such as a CPU. Electronic circuits constituting one device may include a plurality of CPUs.

The various processes described above may be executed not only in chronological order as described but also in parallel or on an individual basis as necessary or depending on the processing capabilities of the apparatuses that execute the processing. It is needless to say that the present invention can appropriately be modified without departing from the gist of the present invention.

When the configuration described above is realized by a computer, processing details of functions that each device should have are described by the program. In addition, when the program is executed by the computer, the processing functions described above are implemented on the computer. The program in which the processing details are described can be recorded on a computer-readable recording medium. An example of a computer-readable recording medium is a non-transitory recording medium. Examples of such a recording medium include a magnetic recording device, an optical disc, a magneto-optical recording medium, and a semiconductor memory.

In addition, the program is distributed, for example, by selling, transferring, or lending a portable recording medium such as a DVD or a CD-ROM with the program recorded on it. Further, the program may be stored in a storage device of a server computer and transmitted from the server computer to another computer via a network, so that the program is distributed.

For example, a computer executing the program first temporarily stores the program recorded on the portable recording medium or the program transmitted from the server computer in its own storage device. When executing the processing, the computer reads the program stored in its own storage device and executes the processing in accordance with the read program. Further, as another execution mode of this program, the computer may directly read the program from the portable recording medium and execute processing in accordance with the program, or, further, may sequentially execute the processing in accordance with the received program each time the program is transferred from the server computer to the computer. The above-described processing may be executed by a so-called application service provider (ASP) service in which processing functions are implemented just by issuing an instruction to execute the program and obtaining results without transmitting the program from the server computer to the computer. Further, the program in the embodiment is assumed to include information which is provided for processing of a computer and is equivalent to a program (data or the like that has characteristics of regulating processing of the computer rather than being a direct instruction to the computer).

In addition, although the apparatus is embodied by executing a predetermined program on a computer in the embodiment, at least a part of the processing details may be implemented by hardware.

DESCRIPTION OF REFERENCE NUMERALS 1, 2 Texture generation apparatus
101, 105 Spatial frequency domain conversion unit
103, 107 Spatial domain conversion unit
102 Decomposition unit
104 Histogram conversion unit
106 Reconstruction unit
21 Conversion unit
22 Synthesis unit

What is claimed is:

1. A texture generation apparatus comprising processing circuitry configured to:
   convert an input original image having pixel values representing depths of positions on a textured surface of a target object to a spatial frequency domain original image;
   convert an input reference image having pixel values representing depths of positions on a textured surface of a reference object to a spatial frequency domain reference image; and
   perform, conversion on the spatial frequency domain original image for making a spatial frequency distribution of the spatial frequency domain original image the same as or substantially the same as spatial frequency distribution of the spatial frequency domain reference image to obtain a spatial frequency domain modulated image corresponding to a modulated image having pixel values representing depths of positions on a textured surface of a modulated object being difficult to distinguish from the reference object by tactile perception.

2. The texture generation apparatus according to claim 1, wherein
   the processing circuitry is configured to perform the conversion on the spatial frequency domain original image for making wavelet statistics of the spatial frequency distribution of the spatial frequency domain original image the same as or substantially the same as wavelet statistics of the spatial frequency distribution of the spatial frequency domain reference image, or the conversion on the spatial frequency domain original image for making a Fourier power spectrum of the spatial frequency distribution of the spatial frequency domain original image the same as or substantially the same as a Fourier power spectrum of a spatial frequency distribution of the spatial frequency domain reference image, to obtain the spatial frequency domain modulated image.

3. The texture generation apparatus according to claim 1, wherein
   the processing circuitry is configured to further convert the spatial frequency domain modulated image into a spatial domain to obtain the modulated image.

4. The texture generation apparatus according to claim 1, wherein
   the target object and the reference object are tactile objects that have two-dimensional distribution of convexities and concavities on surface areas.

5. The texture generation apparatus according to claim 4, wherein
   the modulated image has the pixel values representing depths of positions on the textured surface of the modulated object which gives a touch feeling equivalent to the reference object.

6. A texture generation apparatus, comprising:
   a conversion processing circuitry configured to perform, at spatial frequency bands and orientation bands and on an original image having pixel values representing depths of positions on a textured surface of a target object, a conversion for making an element histogram of a steerable pyramid of the original image the same as or similar to an element histogram of a steerable pyramid of a reference image having pixel values representing depths of positions on a textured surface of a reference object, for each spatial frequency band and each orientation band, to obtain histogram modulated images; and
   a synthesis processing circuitry configured to synthesize the histogram modulated images obtained for the spatial frequency bands and orientation bands to obtain an image corresponding to a modulated image having pixel values representing depths of positions on a textured surface of a modulated object.

7. The texture generation apparatus according to claim 6, wherein
   a spatial frequency distribution of the pixel values representing the depths of the positions on the textured surface of the modulated object is the same as or substantially the same as a spatial frequency distribution of the pixel values representing the depths of the positions on the textured surface of the reference object, and
   the modulated object and the reference object are difficult to distinguish from each other by tactile perception.

8. The texture generation apparatus according to claim 6, wherein
   the conversion processing circuitry comprises:
   a first spatial frequency domain conversion processing circuitry configured to perform a conversion of the original image input and the reference image input into a spatial frequency domain to obtain a spatial frequency domain original image and a spatial frequency domain reference image;
   a decomposition processing circuitry configured to use the spatial frequency domain original image and the spatial frequency domain reference image to obtain a complex steerable pyramid of the spatial frequency domain original image and a complex steerable pyramid of the spatial frequency domain reference image for each of the spatial frequency bands and each of the orientation bands;
   a first spatial domain conversion processing circuitry configured to perform a conversion of the complex steerable pyramid of the spatial frequency domain original image and the complex steerable pyramid of the spatial frequency domain reference image into a spatial domain to obtain a complex steerable pyramid of a spatial domain of the original image and a complex steerable pyramid of a spatial domain of the reference image for each of the spatial frequency bands and each of the orientation bands, obtain a real part of the complex steerable pyramid of the spatial domain of the original image as a steerable pyramid of the original image, and obtain a real part of the complex steerable pyramid of the spatial domain of the reference image as a steerable pyramid of the reference image; and a histogram conversion processing circuitry configured to obtain the histogram modulated images using the steerable pyramid of the reference image and the steerable pyramid of the original image, and the synthesis processing circuitry comprises:

a second spatial frequency domain conversion processing circuitry configured to perform a conversion of the histogram modulated images into a spatial frequency domain to obtain spatial frequency domain histogram modulated images for the spatial frequency bands and the orientation bands;

a reconstruction processing circuitry configured to synthesize the spatial frequency domain histogram modulated images to obtain a spatial frequency domain modulated image; and a second spatial domain conversion processing circuitry configured to perform a conversion of the spatial frequency domain modulated image into a spatial domain to obtain and output the modulated image.

9. A texture generation method, comprising:

converting, on an input original image having pixel values representing depths of positions on a textured surface of a target object to a spatial frequency domain original image;

converting an input reference image having pixel values representing depths of positions on a textured surface of a reference object to a spatial frequency domain reference image; and performing a conversion on the spatial frequency domain original image for making spatial frequency distribution of the spatial frequency domain original image the same as or substantially the same as a spatial frequency distribution of the spatial frequency domain reference to obtain spatial frequency domain modulated image corresponding to a modulated image having pixel values representing depths of positions on a textured surface of a modulated object being difficult to distinguish from the reference object by tactile perception.

10. A texture generation method, comprising:

performing, at spatial frequency bands and orientation bands and on an original image having pixel values representing depths of positions on a textured surface of a target object, a conversion for making an element histogram of a steerable pyramid of the original image the same as or similar to an element histogram of a steerable pyramid of a reference image having pixel values representing depths of positions on a textured surface of a reference object, for each spatial frequency band and each orientation band, to obtain histogram modulated images; and synthesizing the histogram modulated images obtained for the spatial frequency bands and orientation bands to obtain an image corresponding to a modulated image having pixel values representing depths of positions on a textured surface of a modulated object.

11. A non-transitory computer-readable recording medium storing a program for causing a computer to function as the texture generation apparatus according to claim 1.

12. A non-transitory computer-readable recording medium storing a program for causing a computer to function as the texture generation apparatus according to claim 6.

* * * * *